(12) United States Patent
Fujiwara (10) Patent No.: US 7,954,582 B2
(45) Date of Patent: Jun. 7, 2011

(54) MOTORCYCLE

(75) Inventor: Hideki Fujiwara, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 41 days.

(21) Appl. No.: 12/420,705

(22) Filed: Apr. 8, 2009

(65) Prior Publication Data

US 2009/0255748 A1    Oct. 15, 2009

(30) Foreign Application Priority Data

Apr. 14, 2008 (JP) ................................ 2008-104246

(51) Int. Cl.
*B60K 11/08* (2006.01)
(52) U.S. Cl. ..................................................... 180/68.4
(58) Field of Classification Search .................. 180/68.4, 180/68.6, 219, 229
See application file for complete search history.

(56) References Cited

U.S. PATENT DOCUMENTS

| | | | |
|---|---|---|---|
| 6,695,089 B2 | 2/2004 | Adachi et al. | |
| 6,755,217 B1 * | 6/2004 | Yoshida et al. | 138/121 |
| 6,855,287 B1 * | 2/2005 | Anzai | 264/506 |
| 7,478,612 B2 * | 1/2009 | Shiozaki et al. | 123/41.1 |
| 7,665,561 B2 * | 2/2010 | Shiozaki et al. | 180/219 |
| 2001/0045312 A1 | 11/2001 | Adachi et al. | |

FOREIGN PATENT DOCUMENTS

| | | |
|---|---|---|
| EP | 0755819 A1 | 1/1997 |
| EP | 0953499 A2 | 11/1999 |
| EP | 1138588 A2 | 10/2001 |
| JP | 2000136892 A | 5/2000 |
| JP | 2000248938 A | 9/2000 |
| JP | 2001213376 A | 8/2001 |
| JP | 2002211321 A | 7/2002 |
| JP | 2004330990 A | 11/2004 |
| JP | 2007-077908 | 3/2007 |

OTHER PUBLICATIONS

European search report for corresponding European application 09250890 lists the references above.

* cited by examiner

*Primary Examiner* — Kevin Hurley
(74) *Attorney, Agent, or Firm* — Rabin & Berdo, PC (57) ABSTRACT

A motorcycle including a radiator and having an engine offset, and in which increase in vehicle width is suppressed. A center of the engine is out of alignment with respect to a center of a head pipe toward one side in the vehicle width direction. The radiator is arranged in front of the engine. Cooling liquid flows in the radiator in the vehicle width direction. A first piping extends rearward from the other end portion of the radiator and a rear end portion of the first piping is connected to the engine. A second piping connects one end portion of the radiator in the vehicle width direction to the engine. The second piping extends from the one end portion of the radiator to the other side of the engine in the vehicle width direction, between the radiator and the engine, and extends rearward of the other side of the engine in the vehicle width direction.

7 Claims, 9 Drawing Sheets

MOTORCYCLE

RELATED APPLICATIONS

This application claims the benefit of priority under 35 USC 119 of Japanese patent application no. 2008-104246, filed on Apr. 14, 2008, which is hereby incorporated by reference.

BACKGROUND OF THE INVENTION

1. Field of the Invention

The present invention relates to a motorcycle, and particularly relates to a motorcycle including a radiator.

2. Description of Related Art

Figure 9:
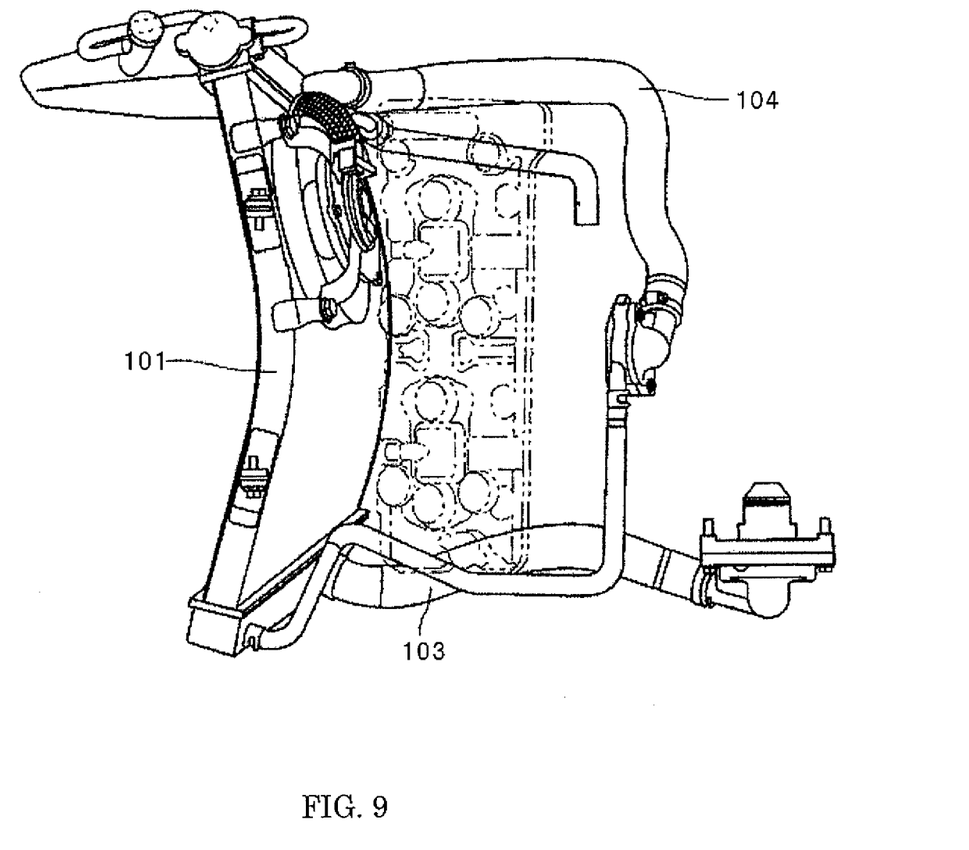
FIG. 9 is a plan view of a cooling device of an engine as disclosed by Japanese Patent Application Laid-Open No. 2007-077908.

A motorcycle including a water-cooled engine is conventionally known. FIG. 9 is a plan view of a cooling device of an engine disclosed by Japanese Patent Application Laid-Open No. 2007-077908. The cooling device of FIG. 9 includes a radiator 101. Cooling liquid from the radiator 101 is supplied to the engine via a supply-side piping 103. Cooling liquid from the engine is returned to the radiator 101 via a return-side piping 104.

Piping connecting a radiator to an engine is preferably short in order to improve cooling efficiency of the engine or the like. Therefore, as shown in FIG. 9, the supply-side piping 103 and the return-side piping 104 are preferably arranged separately on both sides of the engine in a vehicle width direction.

Meanwhile, depending on the specifications of the straddle-type vehicle, a generator is often connected to one end portion of a crankshaft. In such a case, it is often desired to mount an engine such that its center is out of alignment with respect to a center of the vehicle in the vehicle width direction, in order to keep an angle of bank of the motorcycle great. That is, it is often desired to offset the engine from the body frame in the vehicle width direction.

However, if the engine is to be offset from the body frame toward one side in the vehicle width direction, and the supply-side piping and the return-side piping are arranged on both sides of the engine in the vehicle width direction, the vehicle width on one side is disadvantageously large.

SUMMARY OF THE INVENTION

The present invention addresses these issues and suppresses an increase in vehicle width of a motorcycle including a radiator and having an engine offset.

A motorcycle according to the present invention includes a body frame, an engine, a radiator, a first piping and a second piping. The body frame includes a head pipe. The engine is attached to the body frame so that a center of the engine is out of alignment with respect to a center of the head pipe toward one side in the vehicle width direction. The radiator is arranged in front of the engine. A cooling liquid flows in the radiator in the vehicle width direction. The first piping extends rearward from the other end portion of the radiator. A rear end portion of the first piping is connected to the engine. The second piping connects one end portion of the radiator in the vehicle width direction to the engine. The second piping, the engine, the radiator and the first piping form a circulating circuit through which the cooling liquid circulates. The second piping extends from the one end portion of the radiator to the other side of the engine in the vehicle width direction, between the radiator and the engine, and extends rearward of the other side of the engine in the vehicle width direction.

According to the present invention, an increase in vehicle width of a motorcycle including a radiator and having an engine offset is suppressed.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
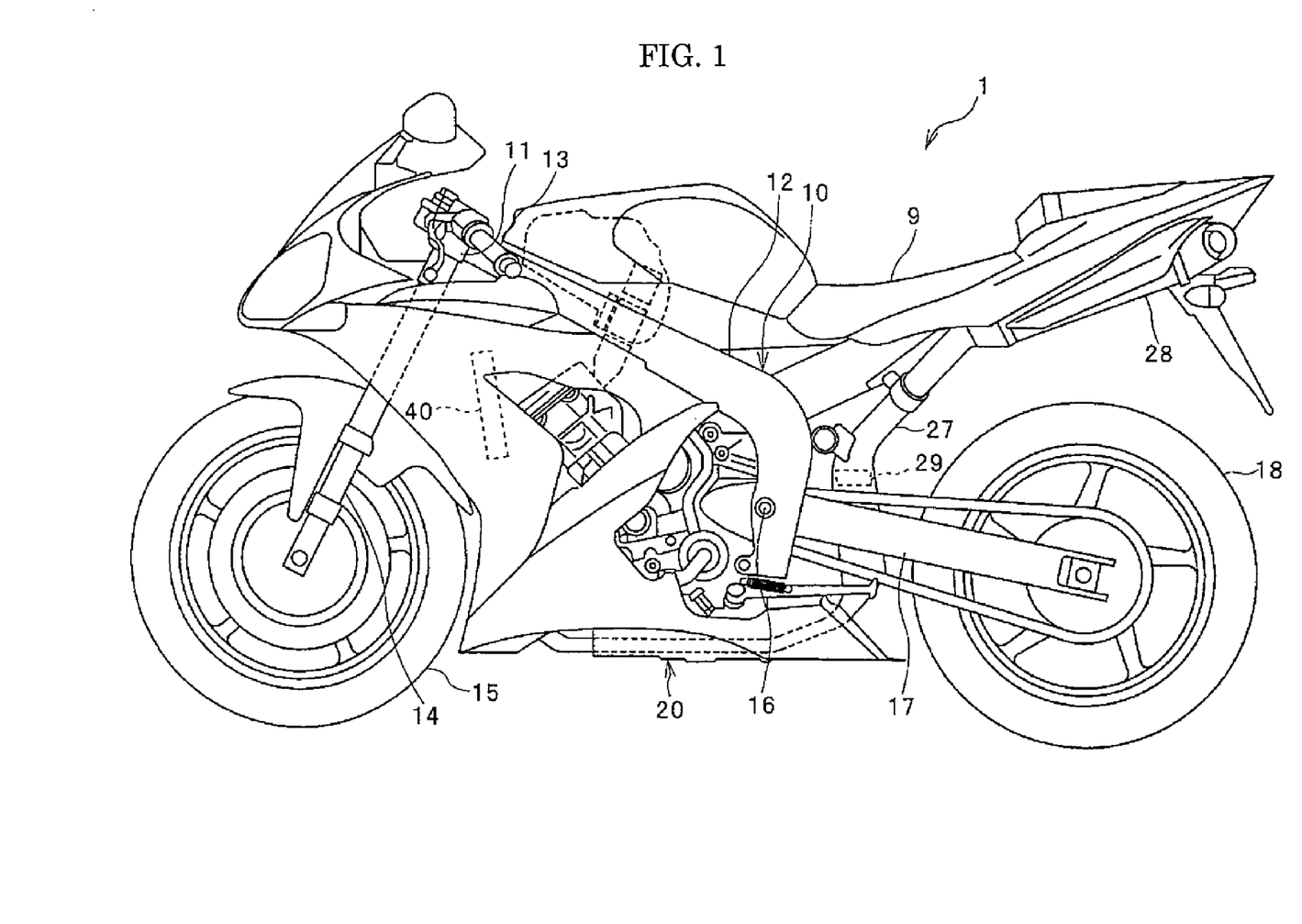
FIG. 1 is a left side view of a motorcycle according to a first embodiment of the invention.

Embodiments of the present invention are now described in detail taking a motorcycle as shown in FIG. 1 as an example. These embodiments are given only for illustrative purposes only and the present invention is not so limited.

The present invention is not limited to motorcycle 1 in a narrow sense, and may be another motorcycle, a scooter, a moped, an off-road vehicle or the like. In the present invention, a motorcycle also includes a vehicle having a front wheel and a rear wheel, at least one of which is constituted by a plurality of wheels, and that is tilted to change a traveling direction. In the following description, the front-back and left-right directions are from the perspective of a rider sitting upright on a seat 9.

First Embodiment (Schematic Configuration of Motorcycle 1)

FIG. 1 is a left side view of the motorcycle 1 according to a first embodiment of the present invention. As shown in FIG. 1, the motorcycle 1 includes a body frame 10. The body frame 10 includes a head pipe 11 and a main frame 12. The head pipe 11 is arranged in a front portion of motorcycle 1. The main frame 12 extends from the head pipe 11 obliquely rearward and downward.

A steering shaft is rotatably inserted into the head pipe 11. A handle 13 and a pair of front forks 14 are connected to the steering shaft. A front wheel 15 is rotatably attached to lower end portions of the paired front forks 14. A pivot shaft 16 is attached to a rear portion of the main frame 12. A rear arm 17 is pivotally attached to the pivot shaft 16. A rear wheel 18 is rotatably attached to a rear end portion of the rear arm 17.

An engine 20 serving as a power source is suspended on the main frame 12. A cross-flow-type radiator 40 is arranged in front of the engine 20. A "cross-flow-type radiator" means a radiator in which cooling liquid flows in the vehicle width direction. "Flowing in the vehicle width direction" means flowing from one side to the other side in the vehicle width direction in a plan view, and includes flowing obliquely upward or obliquely downward from one side to the other side in the vehicle width direction. It is to be noted, however, that a so-called turn-flow-type radiator in which cooling liquid flows from one side to the other side in the vehicle width direction and then flows back to the other side in the vehicle width direction is not a "cross-flow-type radiator".

Figure 2:
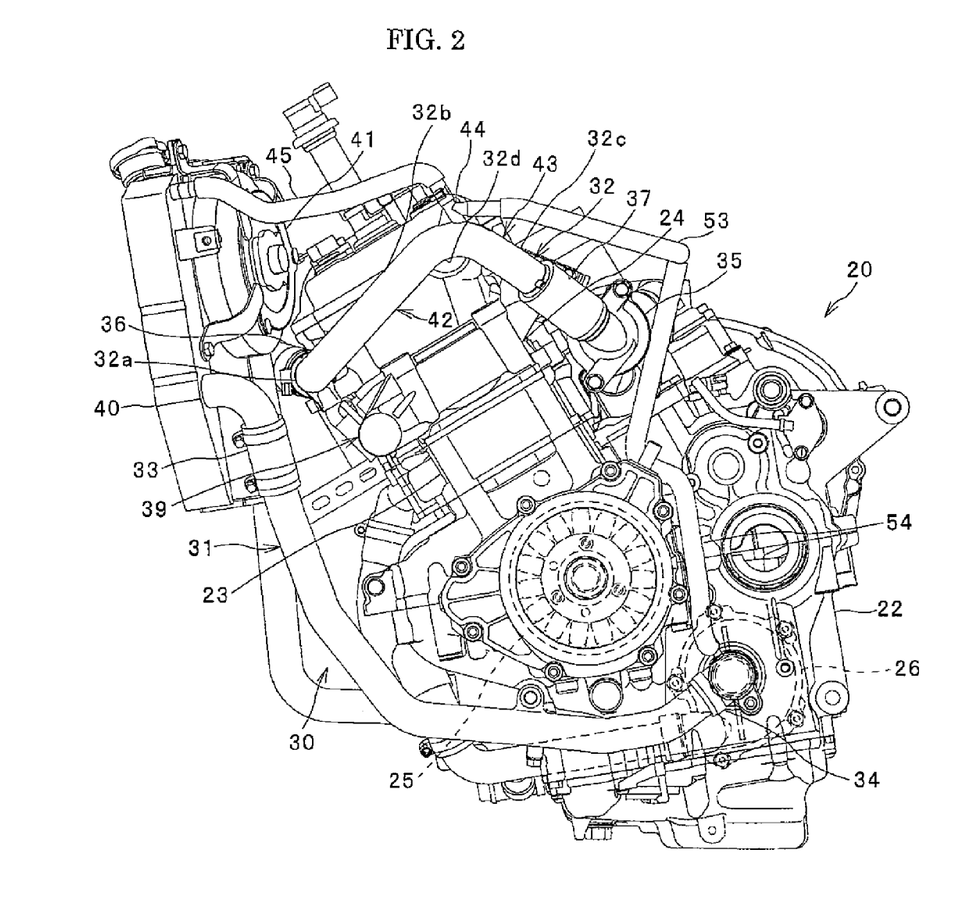
FIG. 2 is a left side view of an engine according to the first embodiment.
Figure 3:
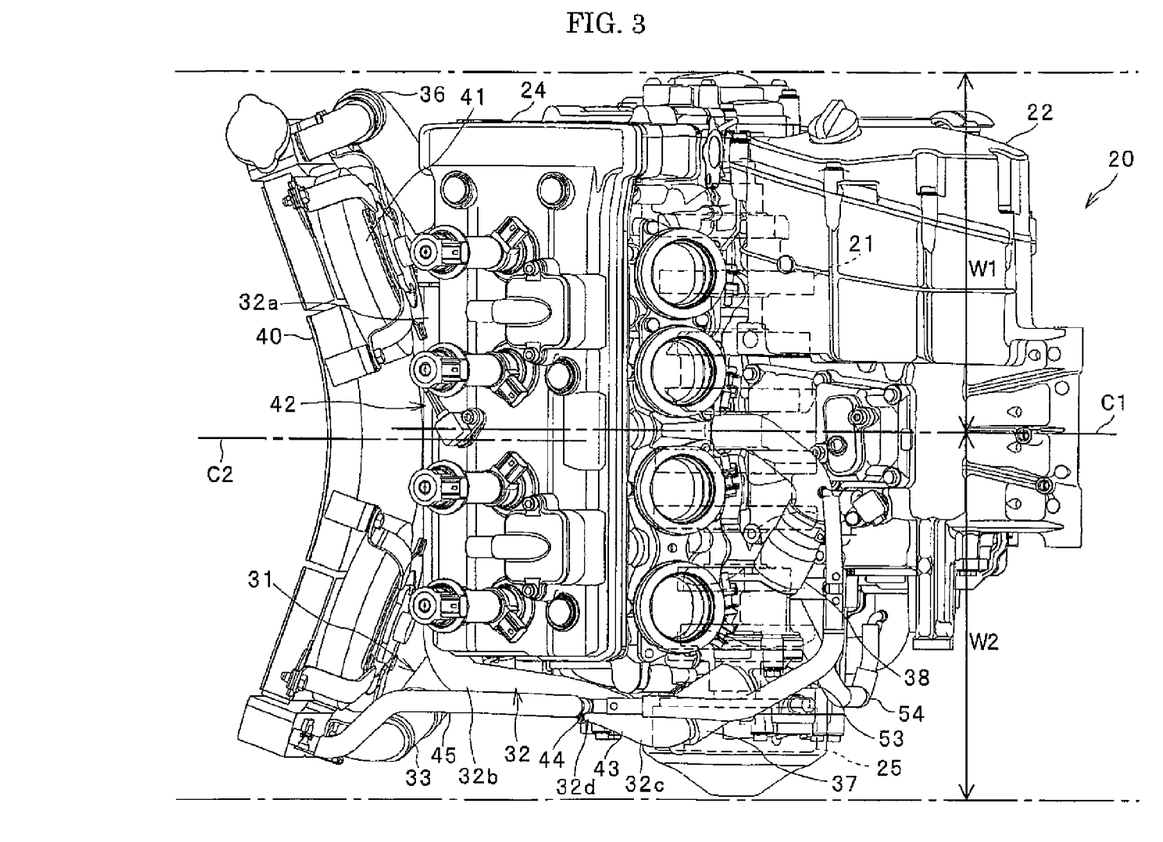
FIG. 3 is a plan view of the engine.

As shown in FIGS. 2 and 3, a radiator fan 41 is arranged on a rear surface of the radiator 40 in order to improve the cooling liquid cooling efficiency of the radiator 40 when, for example, the motorcycle 1 halts or has a low speed.

While water is used as the cooling liquid in this embodiment, the cooling liquid is not limited to water. The cooling liquid may be, for example, a mixture of water and a liquid other than water, such as a mixture of water and antifreeze. Furthermore, the cooling liquid may be a liquid in which one or a plurality of solutes is dissolved in one or a plurality of solvents.

In the present embodiment, the engine 20 is a water-cooled transverse four-cylinder engine. However, the engine is not limited to a specific type as long as it is cooled using cooling liquid. The engine may be, for example, a transverse two-cylinder engine, a transverse three-cylinder engine or a transverse five or more-cylinder engine. Furthermore, the engine may be a single-cylinder engine, an in-line multiple-cylinder engine, a horizontally-opposed multiple-cylinder engine or a V-type multiple-cylinder engine.

An exhaust pipe 27 is connected to the engine 20. An exhaust muffler 28 is connected to a distal end portion of the exhaust pipe 27. Exhaust gas purifying catalyst 29 is arranged within the exhaust pipe 27. Exhaust gas from the engine 20 is emitted into the external air via the exhaust pipe 27 and the exhaust muffler 28. The exhaust gas is purified by the exhaust gas purifying catalyst 29 arranged within the exhaust pipe 27. Specifically, concentrations of carbon monoxide and NOx in the exhaust gas are reduced.

The exhaust gas purifying catalyst 29 is not limited to a specific type and may be a conventionally and normally used catalyst. Generally, an exhaust gas purifying catalyst exhibits low catalytic activity at a normal temperature. Therefore, when the motorcycle 1 starts, the exhaust gas purifying catalyst 29 exhibits low catalytic activity. In a state in which the engine 20 is warmed up and the temperature of the exhaust gas purifying catalyst 29 rises, the exhaust gas purifying catalyst 29 exhibits high catalytic activity.

(Schematic Structure of Engine 20)

Referring mainly to FIGS. 2 and 3, the engine 20 will be described in detail. As shown in FIG. 3, the engine 20 includes a crankshaft 21 that extends in the vehicle width direction and is accommodated in a crankcase 22. As shown in FIG. 2, a cylinder member 39 is attached to a first half part of the crankcase 22 and extends obliquely upward from the crankcase 22 toward a front direction. The cylinder member 39 extends in a direction proximate to the radiator 40 such that a distance between the radiator 40 and the cylinder member 39 narrows in an upward direction.

The cylinder member 39 includes a body cylinder 23 attached to the first half part of the crankcase 22, and a head cylinder 24 attached to an upper portion of the body cylinder 23. The head cylinder 24 is located behind the radiator 40. An upper end portion of the head cylinder 24 is located behind radiator fan 41 attached to a rear surface of the radiator 40. Four cylinders are formed in parallel in the body cylinder 23.

A piston is slidably and displaceably arranged in each of the cylinders. Each piston is connected to the crankshaft 21.

As shown in FIG. 3, a generator 25 is arranged in a left end portion of the crankshaft 21. Rotation of the crankshaft 21 is transmitted to the generator 25 to drive the generator 25. As shown in FIG. 2, a water pump 26 is arranged in the crankcase 22 obliquely downward of the generator 25.

(Arrangement of Engine 20)

As shown in FIG. 3, a center axis C1 of the engine 20 is rightward of a center axis C2 of the motorcycle 1 in the vehicle width direction. That is, in the present embodiment, the engine 20 is offset rightward in the vehicle width direction.

Where the number of cylinders arranged in the vehicle width direction is 2n (n is a natural number), the "center axis of the engine in the vehicle width direction" passes a center between a center axis of an $n^{th}$ cylinder and a center axis of an $(n+1)^{th}$ cylinder from one side in the vehicle width direction, and extends in the front-back direction. For example, in the present embodiment, as the engine 20 is a transverse four-cylinder engine, the center axis C1 passes a center between a center axis of the second cylinder from the right and the third cylinder from the right in the vehicle width direction, and extends in the front-back direction. Further, where the number of cylinders arranged in the vehicle width direction is 2m+1 (m is an integer equal to or greater than 0), the "center axis of the engine in the vehicle width direction" passes a center axis of an $(m+1)^{th}$ cylinder from the right in the vehicle width direction, and extends in the front-back direction. Specifically, in the case of a single-cylinder engine, the center axis of the engine in the vehicle width direction passes a center axis of a cylinder and extends in the front-back direction. In the case of a three-cylinder engine, the center axis of the engine in the vehicle width direction passes a center axis of a cylinder located at a center, and extends in the front-back direction.

Moreover, the "center axis of the straddle-type vehicle in the vehicle width direction" passes a center axis of the head pipe and extends in the front-back direction in a plan view. The center axis C2 in the present embodiment passes a center axis of the head pipe 11 (FIG. 1) and extends in the front-back direction.

As shown in FIG. 3, because the generator 25 is arranged in the left end portion of the crankshaft 21, a distance W2 from the center axis C1 of the engine 20 to a left end portion of the engine 20 is longer than a distance W1 from the center axis C1 of the engine 20 to a right end portion of the engine 20.

As shown in FIG. 3, a center axis of the radiator 40 is substantially identical in position to the center axis C1 of the motorcycle 1 in the vehicle width direction. That is, the radiator 40 is substantially not offset in the vehicle width direction.

A right end of the engine 20 is substantially flush with a right end of the radiator 40 in the vehicle width direction, and a left end of the engine 20 is substantially flush with a left end of the radiator 40. More specifically, both ends of the radiator 40 are located slightly inward of those of the engine 20 in the vehicle width direction.

(Connection of Radiator 40 to Engine 20)

Figure 6:
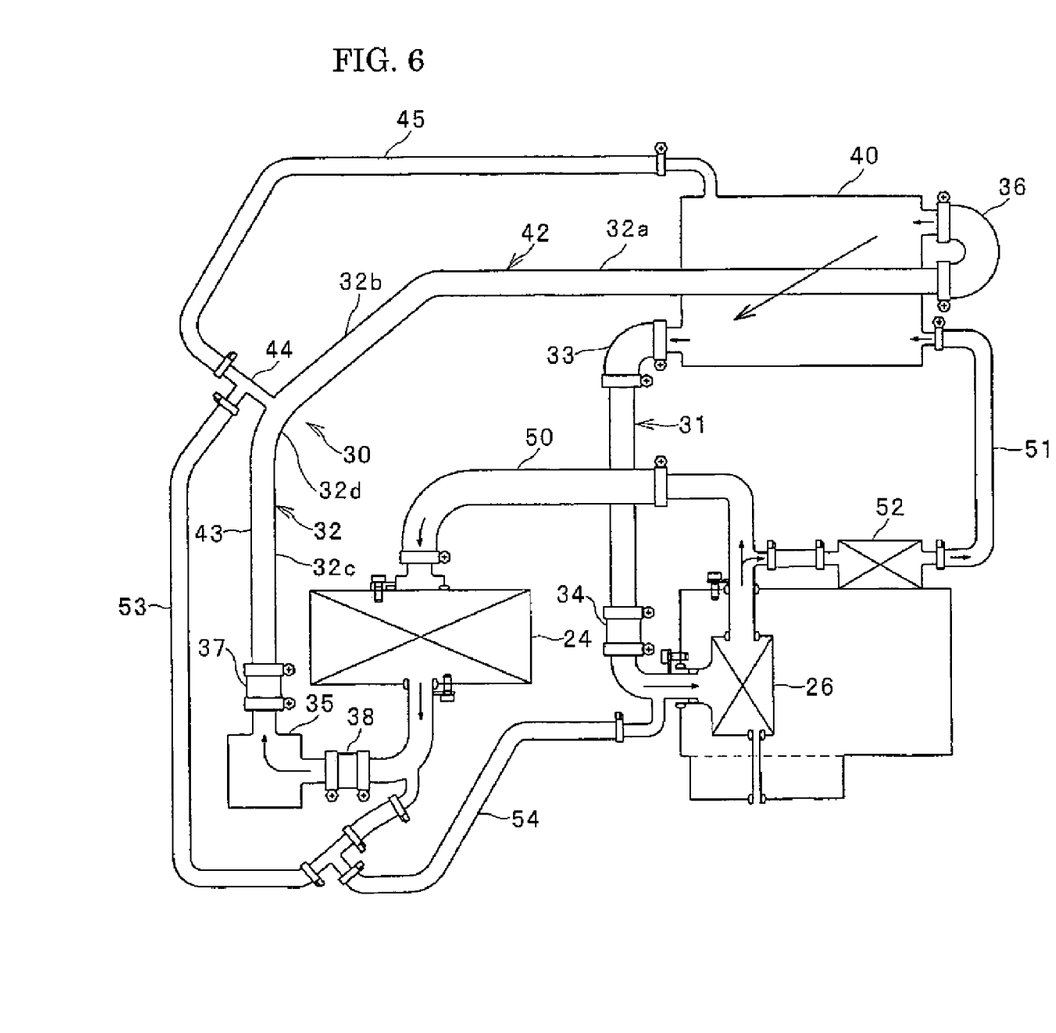
FIG. 6 is a circuit diagram for cooling water according to the first embodiment.

As shown in FIGS. 2, 3 and 6, the engine 20 is connected to the radiator 40 by a first piping 31 and a second piping 32. The first piping 31 is connected to the left end portion of the radiator slightly below a central portion of the radiator 40 in a height direction. As shown in FIG. 2, the first piping 31 is connected to a lower portion of a second half part of the crankcase 22.

As shown in FIG. 3, the second piping 32 is connected to the right, upper end portion of the radiator 40. As shown in FIGS. 2 and 6, the second piping 32 is connected to the head cylinder 24 via a thermostat 35.

As shown in FIG. 6, cooling water cooled in the radiator 40 is transferred to the engine 20 via the first piping 31 and circulates in the engine 20. Cooling water circulating in the engine 20 is transferred to the radiator 40 via the second piping 32. In this way, the first piping 31, the second piping 32, the radiator 40 and the engine 20 form a circulating circuit 30 through which cooling liquid circulates.

The first piping 31 and the second piping 32 may be directly connected, respectively, to the engine 20 and the radiator 40. Alternatively, the first piping 31 and the second piping 32 may be connected to the engine 20 and the radiator 40 by joints, for example. Specifically, in the present embodiment, as shown in FIGS. 2 and 6, the first piping 31 is connected to the radiator 40 by a joint 33 and to the crankcase 22 by a joint 34. As shown in FIGS. 3 and 6, the second piping 32 is connected to the radiator 40 by a joint 36 and to the head cylinder 24 by a joint 37, the thermostat 35 and a joint 38. Thermostat 35 is not shown in FIG. 3 for convenience of description.

In the present embodiment, at least one of the first piping 31 and the second piping 32 is substantially constituted by resin piping. Specifically, a longer of the first piping 31 and the second piping 32, that is, at least the second piping 32 is substantially constituted by resin piping. More specifically, in the present embodiment, both the first piping 31 and the second piping 32 are constituted by resin piping formed integrally.

The first piping 31 and the second piping 32 may be formed integrally or by connecting a plurality of pipings. For example, the first piping 31 and the second piping 32 may be formed by connecting a plurality of resin pipings by resin, rubber or metal joints. In the present embodiment, the "piping is substantially constituted by the resin piping" encompasses the piping that is formed by a plurality of resin pipings connected by non-resin joints.

As shown in FIG. 2, the first piping 31 extends obliquely rearward from the left end portion of the radiator 40 and downward toward the left of the engine 20. The first piping 31 is connected to the lower portion of the second half part of the crankcase 22 via below the generator 25.

As shown in FIG. 3, the second piping 32 extends from the right end portion of the radiator 40 substantially horizontally toward the left of the engine 20, between the radiator 40 and the engine 20, in the front-back direction. The second piping 32 is bent rearward at the diagonally forward left of the engine 20. As shown in FIGS. 2 and 3, the second piping 32 extends rearward at the left of the engine 20.

As shown in FIG. 2, the second piping 32 includes a first piping section 32a, a second piping section 32b and a third piping section 32c. The first piping section 32a and the second piping section 32b constitute a radiator-side piping section 42. The third piping section 32c constitutes an engine-side piping section 43.

Figure 4:
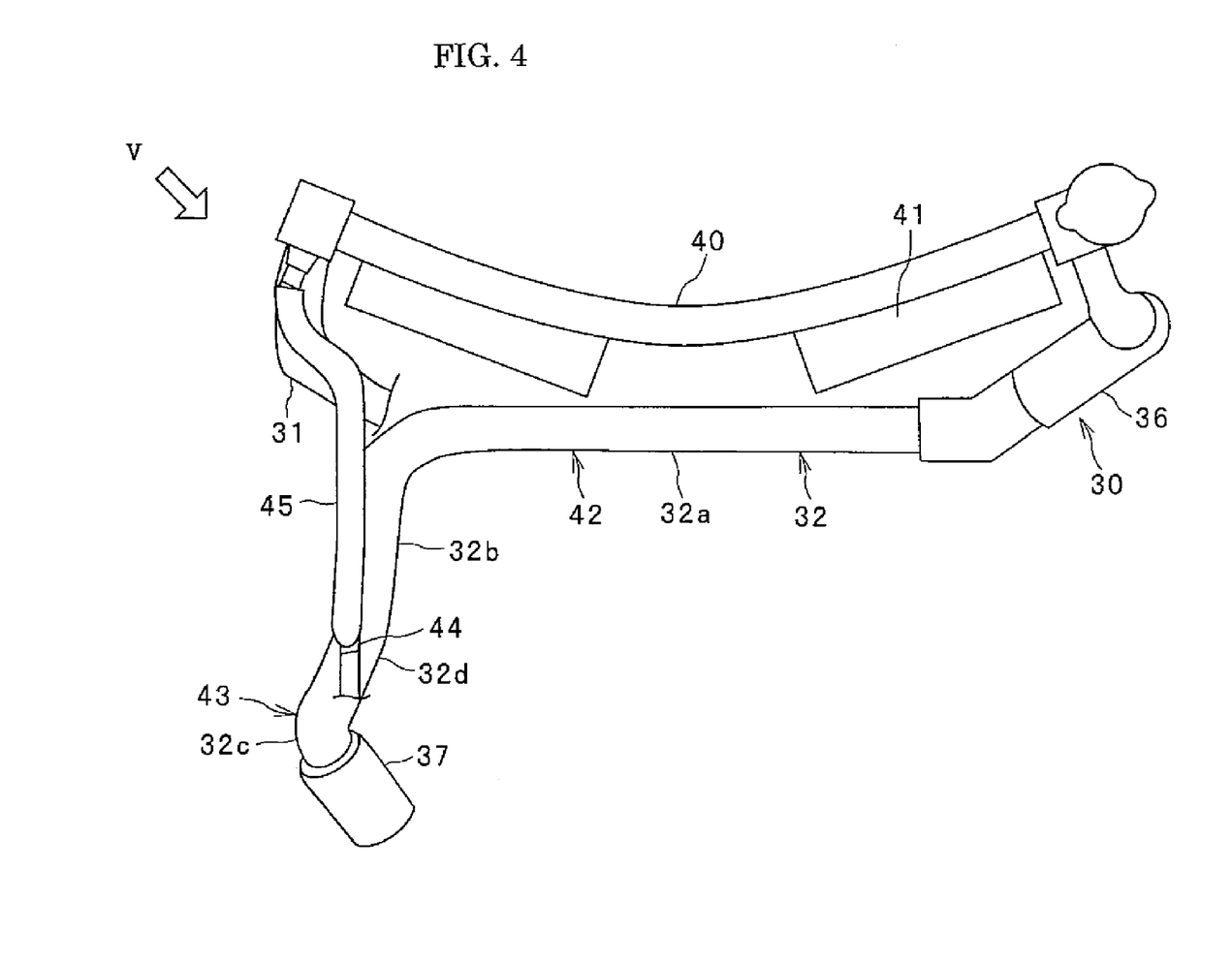
FIG. 4 is a schematic plan view of a radiator, a first piping and a second piping according to the first embodiment.
Figure 5:
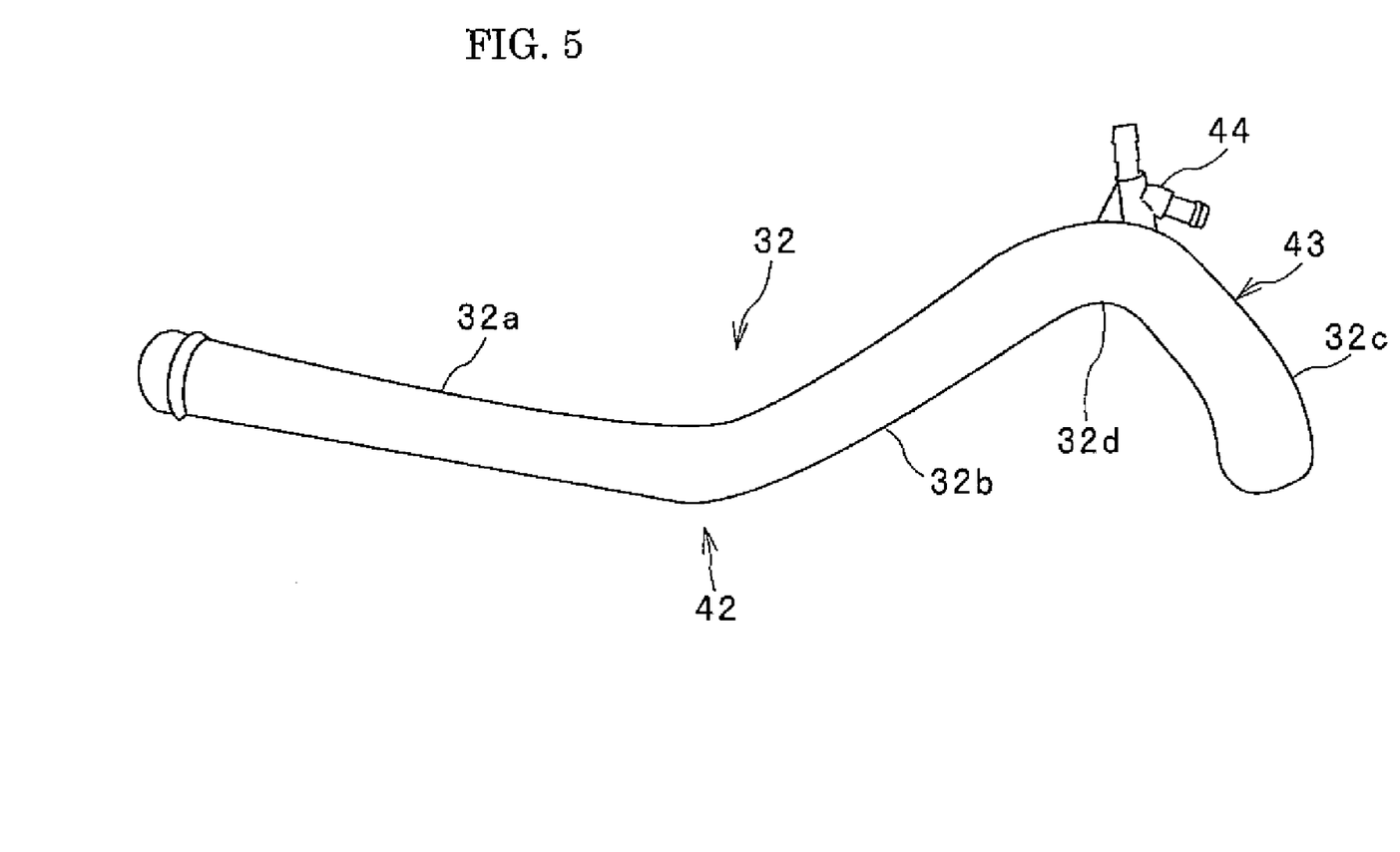
FIG. 5 is a schematic view of the second piping as viewed from direction V of FIG. 4.

As shown in FIG. 4, the first piping section 32a is connected to the joint 36. A left end portion of the first piping section 32a is connected to the second piping section 32b. As shown in FIG. 2, the first piping section 32a extends substantially horizontally to the vehicle width direction between the radiator 40 and the engine 20. Specifically, the first piping section 32a is arranged between the head cylinder 24 and the radiator 40 and at a position lower than the radiator fan 41. Further, as shown in FIG. 3, at least a part of the first piping section 32a overlaps with the cylinder member 39 in a plan view. Specifically, at least a part of the first piping section 32a overlaps with the head cylinder 24 in a plan view.

As shown in FIG. 2, the second piping section 32b extends from a connection section, in which the second piping section 32b is connected to the first piping section 32a, substantially linearly obliquely upward and rearward at the left of the engine 20. The radiator-side piping section 42 thereby becomes higher from the radiator 40 side to the engine 20 side.

A rear end portion of the second piping section 32b is connected to the third piping section 32c serving as the engine-side piping section 43. A rear end portion of the third piping section 32c is connected to a joint 37. The third piping section 32c extends obliquely downward to rearward at the left of the engine 20. A connection section 32d, in which the third piping section 32c is connected to the second piping section 32b, is thereby located at the highest position of the second piping 32.

In this way, connection section 32d in which the second piping section 32b is connected to the third piping section 32c is located at the highest position of the second piping 32. A bleeder piping 45 is connected to connection section 32d via a joint 44 and thus is connected to the highest portion of the second piping 32. As shown in FIGS. 2 and 3, a front end portion of the bleeder piping 45 is connected to the left end portion of the upper end portion of the radiator 40.

(Cooling Water Circulating Circuit 30)

Referring mainly to FIG. 6, a configuration of the circulating circuit 30 through which cooling water circulates is described in more detail. A main circuit of the circulating circuit 30 includes the water pump 26, a circulation path 50, the head cylinder 24, the second piping 32, the radiator 40 and the first piping 31, all of which are arranged in the engine 20.

The circulation path 50 connects the water pump 26 to the head cylinder 24. Cooling water pressured by the water pump 26 is transferred to a water jacket formed in the head cylinder 24 via circulation path 50 and cools the head cylinder 24. The circulation path 50 may be formed either within the engine 20 or by piping arranged outside of the engine 20.

Cooling water from the head cylinder 24 is transferred to the radiator 40 via the thermostat 35 and the second piping 32. The cooling water is cooled in the radiator 40 and is returned to the water pump 26 via the first piping 31.

The water pump 26 and the radiator 40 are also connected to each other by a circulation path 51. An oil cooler 52 is arranged on the circulation path 51 and is supplied with cooling water. Therefore, the oil cooler 52 cools lubricating oil supplied to a slide section or the like of the engine 20.

Circulating circuit 30 includes a circulation path 53 connecting the head cylinder 24 to the joint 44 and a circulation path 54 connecting the head cylinder 24 to the water pump 26. If the thermostat 35 is closed, cooling water from the head cylinder 24 flows into the second piping 32 through the joint 44 via circulation path 53.

The joint 44 and the radiator 40 are connected to the radiator 40 by the bleeder piping 45. Air in the second piping 32 is emitted from the second piping 32 via bleeder piping 45.

In considering the cooling efficiency of the engine 20, the first piping 31 and the second piping 32 are preferably as short as possible. Therefore, if the engine is offset toward one side in the vehicle width direction as described in the present embodiment, a turn-flow-type radiator is normally used so that the first piping and the second piping are arranged on the other side of the engine in the vehicle width direction.

However, the inventors have found that a turn-flow-type radiator is lower in cooling efficiency than a cross-flow-type radiator. Therefore, even if a turn-flow-type radiator is used and lengths of the first and second pipings are made small by arranging the first and second pipings on the other side of the engine in the vehicle width direction, the cooling liquid cooling efficiency cannot be improved due to deterioration in cooling capability of the radiator itself. As a result, the inventors reached a configuration, as shown in the present embodiment, in which the radiator 40 is a cross-flow-type radiator and in which both the first piping 31 and the second piping 32 are arranged on one side of the engine 20 in the vehicle width direction. With this configuration, high cooling liquid cooling efficiency is realized and the vehicle width of the motorcycle 1 is suppressed.

In a transverse multiple-cylinder engine as shown in the present embodiment, in particular, a width of the engine tends to be large. Therefore, the configuration of the present embodiment is particularly effective for such an engine.

It is noted, however, that if the second piping 32 is led from one side to the other side in the vehicle width direction as shown in the present embodiment, the length of the second piping 32 becomes large. Therefore, if the second piping section is arranged to be monotonically higher or monotonically lower from, for example, a radiator 40 side to an engine 20 side, a tilt angle of the second piping section is small. Consequently, a problem occurs in that air tends to be accumulated in the second piping section.

To solve the problem, in the present embodiment, the second piping 32 is formed so that the connection section 32d in which the radiator-side piping section 42 is connected to the engine-side piping section 43 is the highest. The bleeder piping 45 is connected to the connection section 32d. Air in the second piping 32 is thereby gathered in the connection section 32d and efficiently emitted from the bleeder piping 45. According to the present embodiment, therefore, accumulation of air in the second piping 32 is suppressed.

Moreover, in the present embodiment, the connection section 32d is arranged laterally to the engine 20. The bleeder piping 45 can thereby be arranged laterally to the engine 20, such that positional interference among the bleeder piping 45, the radiator 40 and the cylinder member 39 is suppressed. As compared with, for example, an instance in which the connection section 32d and the bleeder piping 45 are arranged between the engine 20 and the radiator 40, the engine 20 and the radiator 40 can be made small in size as a whole.

Iron piping is conventionally and mainly used to connect the engine to the radiator. In a state in which the engine is sufficiently warmed up, the temperature of the cooling liquid is relatively high. Generally, this is considered to efficiently cool high-temperature cooling liquid by a small radiator, by improving the cooling efficiency of the entire cooling liquid circulating circuit including the radiator. The piping connecting the engine to the radiator is thus normally metal piping having high heat conductivity.

If the piping connecting the engine to the radiator is resin piping, for example, a radiation amount from the cooling liquid in the piping is small and the cooling efficiency for cooling the cooling liquid tends to be deteriorated. Considering the cooling efficiency for cooling the cooling liquid, therefore, it is not always preferable to use resin piping to connect the engine to the radiator.

Nevertheless, if iron piping is used to connect the engine to the radiator, cooling liquid warmed by the engine is cooled by the piping connecting the engine to the radiator during warming up of the engine. The time required to warm up the engine therefore tends to be long. As stated above, the exhaust gas purifying catalyst 29 exhibits low catalytic activity in the low temperature state. Thus, the catalytic activity of the exhaust gas purifying catalyst 29 is relatively low during warming up of the engine, and it is difficult to reduce emission of exhaust gas that is lower in degree of purification than exhaust gas emitted when the engine is warmed up. Accordingly, it tends to be difficult to comply with recent stricter emission controls.

In this embodiment, by contrast, at least one of the first piping 31 and the second piping 32 is constituted by resin piping. During warming up of the engine 20, reduction in temperature of cooling liquid in the first piping 31 and the second piping 32 is thereby suppressed, and engine 20 can be warmed up relatively quickly. Accordingly, emission of exhaust gas before the engine 20 is warmed up that is lower in degree of purification than exhaust gas emitted when the engine 20 is warmed up is effectively reduced, thereby facilitating compliance with recent stricter emission controls.

In the present embodiment, at least the longer of the first piping 31 and the second piping 32 is constituted by resin piping. Reduction in the temperature of cooling liquid in the first piping 31 and the second piping 32 is thereby effectively suppressed.

In the present embodiment, both the first piping 31 and the second piping 32 may be constituted by resin piping. Reduction in the temperature of cooling liquid in the first piping 31 and the second piping 32 is thereby particularly effectively suppressed.

Moreover, in the present embodiment, the radiator 40 is a cross-flow-type radiator. Cooling efficiency for cooling the cooling liquid is thus high in the radiator 40, and high cooling efficiency for cooling the cooling liquid after the engine 20 is sufficiently warmed up is thereby attained.

In the present embodiment, the first piping section 32a overlaps with the cylinder member 39 in a plan view. A front-back length of the engine 20 can thus be reduced. Furthermore, the first piping section 32a is arranged at a position lower than the radiator fan 41, such that positional interference between the radiator fan 41 and the first piping section 32a is suppressed. As a result, the radiator 40 and the engine 20 can be arranged proximately in the front-back direction, and the engine 20 and the radiator 40 can therefore be made small in size as a whole.

(Method of Manufacturing Resin Piping)

In the present embodiment, the method of manufacturing the resin piping is not limited to a specific method. The resin piping can be manufactured by, for example, a so-called RFM (RP TOPLA Floating core Molding) formation method such as that disclosed in Japanese Patent No. 3771295 or the like.

Figure 7:
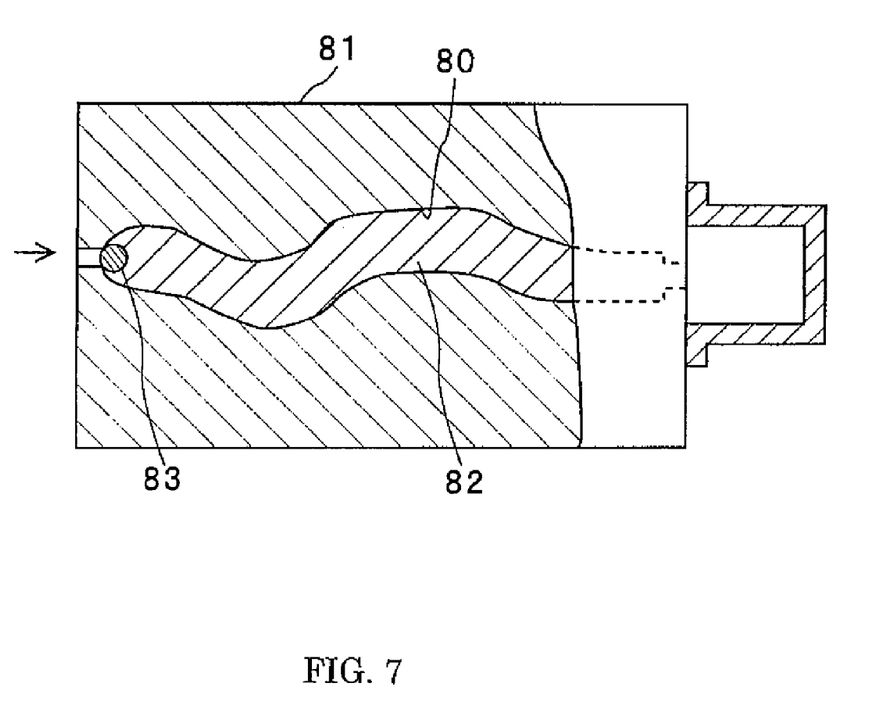
FIG. 7 is a schematic partial cross-sectional view for explaining an RFM formation method according to the first embodiment.
Figure 8:
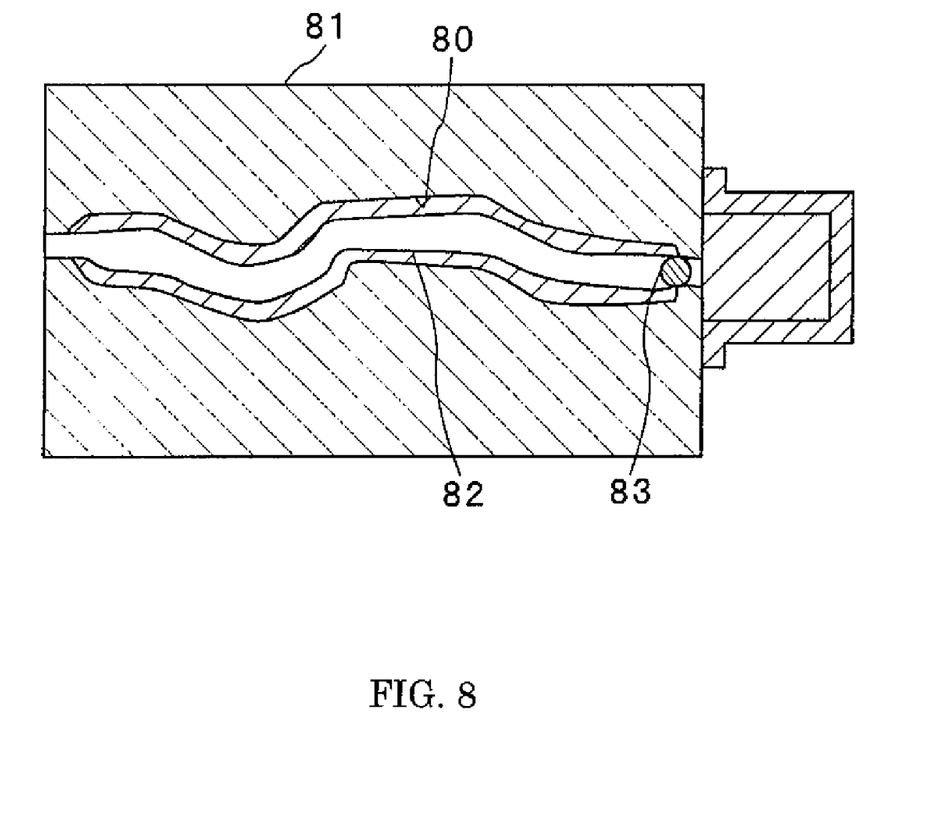
FIG. 8 is a schematic partial cross-sectional view for explaining the RFM formation method.

If the resin piping is to be manufactured by the RFM formation method, as shown in FIG. 7, a forming die 81 in which a formation space 80 substantially identical in external shape to the resin piping to be manufactured is prepared. While the forming die 81 is kept at a predetermined temperature, molten resin 82 is filled up in the formation space 80. As shown in FIG. 8, by applying gas pressure from a proximal end side of the formation space 80, a floating core 83 substantially identical in inside diameter to the resin piping to be manufactured is moved from the proximal end side to a distal end side of the formation space 80, whereby resin piping substantially uniform in thickness is manufactured.

MODIFICATION EXAMPLE

An embodiment has been described in which both the first piping 31 and the second piping 32 are constituted by resin piping. However, the first piping 31 and the second piping 32 may not necessarily be resin piping. For example, a part of or a front portion of the relatively short first piping 31 may be made of metal. In addition, both the first piping 31 and the second piping 32 may be made of metal.

The invention claimed is:

1. A motorcycle comprising:
a body frame including a head pipe;
an engine attached to the body frame so that a center of the engine is out of alignment with respect to a center of the head pipe toward one side in the vehicle width direction;
a radiator arranged in front of the engine, in which a cooling liquid flows in the vehicle width direction, wherein the engine is adjacent to the radiator;
a first piping extending rearward from the other end portion of the radiator, and having a rear end portion connected to the engine; and
a second piping that connects one end portion of the radiator in the vehicle width direction to the engine and that, together with the second piping, the engine, the radiator, and the first piping, forms a circulating circuit through which the cooling liquid circulates, wherein
the second piping extends from the one end portion of the radiator to the other side of the engine in the vehicle width direction, between the radiator and the engine, and extends rearward of the other side of the engine in the vehicle width direction;
a crankcase; and
a cylinder member connected to the crankcase, and extending obliquely upward and forward, and
at least a part of a portion of the second piping located between the radiator and the engine overlaps with the cyclinder member in a plan view.

2. The motorcycle according to claim 1, wherein a highest portion of the second piping is located laterally to the engine, and the motorcycle further includes a bleeder piping connected to the highest portion of the second piping.

3. The motorcycle according to claim 1, wherein the engine includes:
a crankshaft; and
a generator provided in an end portion of the crankshaft.

4. The motorcycle according to claim 1, wherein the engine includes a body cylinder, a plurality of cylinders arranged in the vehicle width direction being formed in the body cylinder.

5. The motorcycle vehicle according to claim 1, wherein the second piping is substantially constituted by resin piping.

6. The motorcycle vehicle according to claim 5, wherein the first piping is substantially constituted by resin piping.

7. The motorcycle vehicle according to claim 1, further comprising:
a radiator fan attached to a rear surface of the radiator, wherein the engine includes:
a crankcase; and
a cylinder member connected to the crankcase, and extending obliquely upward and forward so that a distance between the cylinder member and the radiator narrows in an upward direction, an upper end portion of the cylinder member is located behind the radiator fan, and a portion of the second piping located between the radiator and the engine is arranged at a position lower than the radiator fan.

* * * * *